United States Patent [19]
Gordon et al.

[11] Patent Number: 5,315,690
[45] Date of Patent: May 24, 1994

[54] METHOD AND ASSOCIATED APPARATUS FOR USE WITH AN AUTOMATED SIGN GENERATOR TO PRODUCE ENHANCED GRAPHICS

[75] Inventors: Thomas A. Gordon, Hebron; Barrett C. Gray, Tolland; William McKenna, Vernon; Joseph W. Stempien, Newington; Ken P. Magnon, Bristol, all of Conn.

[73] Assignee: Gerber Scientific Products, Inc., Manchester, Conn.

[21] Appl. No.: 746,871

[22] Filed: Aug. 19, 1991

[51] Int. Cl.⁵ .............................................. G06K 15/00
[52] U.S. Cl. .................................... 395/104; 395/103; 395/109
[58] Field of Search ............... 395/104, 101, 103, 105, 395/109–110; 33/18.2, 18.1, 23.11, 26; 346/33 R, 139 B, 157, 154; 156/248, 252, 253, 268, 247

[56] References Cited

U.S. PATENT DOCUMENTS

| | | | |
|---|---|---|---|
| 4,445,275 | 5/1984 | Dubrow | 33/30 R |
| 4,467,525 | 8/1984 | Logan et al. | 33/18 B |
| 4,512,834 | 4/1985 | Gerber | 156/248 |
| 4,909,884 | 3/1990 | Wormser | 156/248 |

*Primary Examiner*—Arthur G. Evans
*Attorney, Agent, or Firm*—McCormick, Paulding & Huber

[57] ABSTRACT

A method and associated apparatus for use in an automated sign generator to produce enhanced special effect graphics and single layer multi-color signs on a vinyl sheet material uses a paint pen carried by the tool head of the generator which in coordinated movement with the vinyl sheet traces the shape of the sign. In one embodiment, the sheet material is cut along a line falling within the painted stripe defining the graphic. The cut graphic having the desired visual special effect is removed from the sheet material along the cut line. The apparatus further includes a guide wheel assembly located between a material deflector and a feed roller for riding along the marginal portions of the sheet material causing it to move along a broken plane path to prevent buckling as it moves relative to the tool head and to prevent smudging of the painted graphic. A cam clip assembly is located behind the feed roller and intermediate the feed roller and a cam shaft and rides along the marginal portions of the sheet material to cause the material to move along a broken plane path to prevent its buckling and avoid smearing of a painted graphic on the surface. A paint pen which is interchangeable with a cutting tool is carried by the tool head and includes a number of interchangeable paint nibs.

14 Claims, 6 Drawing Sheets

METHOD AND ASSOCIATED APPARATUS FOR USE WITH AN AUTOMATED SIGN GENERATOR TO PRODUCE ENHANCED GRAPHICS

BACKGROUND OF THE INVENTION

The present invention relates generally to sign making and sign making apparatus and deals more particularly with an improved method for producing enhanced graphics. The invention further relates to such signal making apparatus for producing the enhanced graphics.

Automated sign generating apparatus for producing large scale text on sheet material, such as vinyl, is generally well known. U.S. Pat. No. 4,467,525 assigned to the same assignee as the present invention discloses such as automated sign generator wherein the vinyl sign material is supported for movement in one coordinate direction relative to a cutting tool which is moved in accordance with pre-programmed data. The vinyl sign material is pierced in accordance with the program data to cut the vinyl in accordance with the desired size and shape. The vinyl sign material is generally releasably secured by pressure sensitive adhesives to a paper release liner. For further details of the operation of such an automated sign generator, reference may be made to the above-referenced patent and which disclosure is incorporated herein by reference.

In order to provide enhanced or special effect graphics, such as outlining, shadowing and so forth it is generally necessary to cut several different color vinyl sheets and apply the cut portions in layers in registration. Such procedures are time consuming, require additional amounts of vinyl sheet materials and require a high degree of skill on the part of an operator to produce the enhanced graphic.

Another disadvantage of known methods for producing special effects is the inability to generate single layer multicolor signs.

A further disadvantage with known sign generating apparatus is the inability to paint a graphic without smearing or smudging the graphics as the sheet material moves.

Accordingly, it is general aim of the present invention to provide a method and improved apparatus for use with an automated sign generator to produce enhanced or special effect graphics.

SUMMARY OF THE INVENTION

In accordance with the present invention, a method and associated apparatus for use with an automated sign generator to produce enhanced or special effect graphics is presented. One aspect of the invention includes painting a desired graphic text on a sheet material, such as a releasable vinyl, using one of a number of different style paint nibs, then cutting the sheet material along a line falling within the painted stripe defining the graphic text and finally removing the graphic text from the sheet material along the cut line to produce a graphic text having the desired visual special effect. The vinyl sheet material may be of a first color and the paint of a second color thereby producing a single layer multicolor sign.

In another aspect of the invention, a paint pen is used interchangeably with a cutter to produce the desired enhanced graphic or special effect.

In a further aspect of the invention, the vinyl sheet material is fed along a broken path in one coordinate direction past a tool head which moves in a second coordinate direction such that the relative composite movement between the tool head and the sheet material traces the outline of the graphic. The sheet material is supported by a drive roller and maintained in a fixed spacial relation with the tool head by means of a material deflector which has an upwardly sloping surface for supporting the sheet material and a wheel guide assembly located intermediate the material deflector and the feed roller. The guide wheel assembly rides on the marginal portions of the sheet material to cause the material to move along a broken plane path to prevent buckling of the sheet material as it moves beneath the tool head. Because the guide wheel assembly only contacts the marginal portions of the vinyl sheet material, a graphic painted on the surface of the sheet material is not smeared or smudged as the sheet material moves along its path. A cam clip assembly is located behind the feed roller and is arranged to provide support for the sheet material as it moves along its travel path. The cam clip assembly includes an inwardly extending curved flange portion which presses against the marginal portions of the vinyl sheet material to cause the material to move in a broken plane path to prevent buckling of the sheet material as it moves over the feed roller.

In a further aspect of the invention, a paint pen is provided which is interchangeable with the cutting tool carried by the tool head and in combination with the cutting tool produces an enhanced graphic providing the desired visual special effect.

BRIEF DESCRIPTION OF THE DRAWINGS

Other features and advantages of the present invention will be readily apparent from the following description taken in conjunction with the drawings wherein.

DETAILED DESCRIPTION OF PREFERRED EMBODIMENTS

Figure 1:
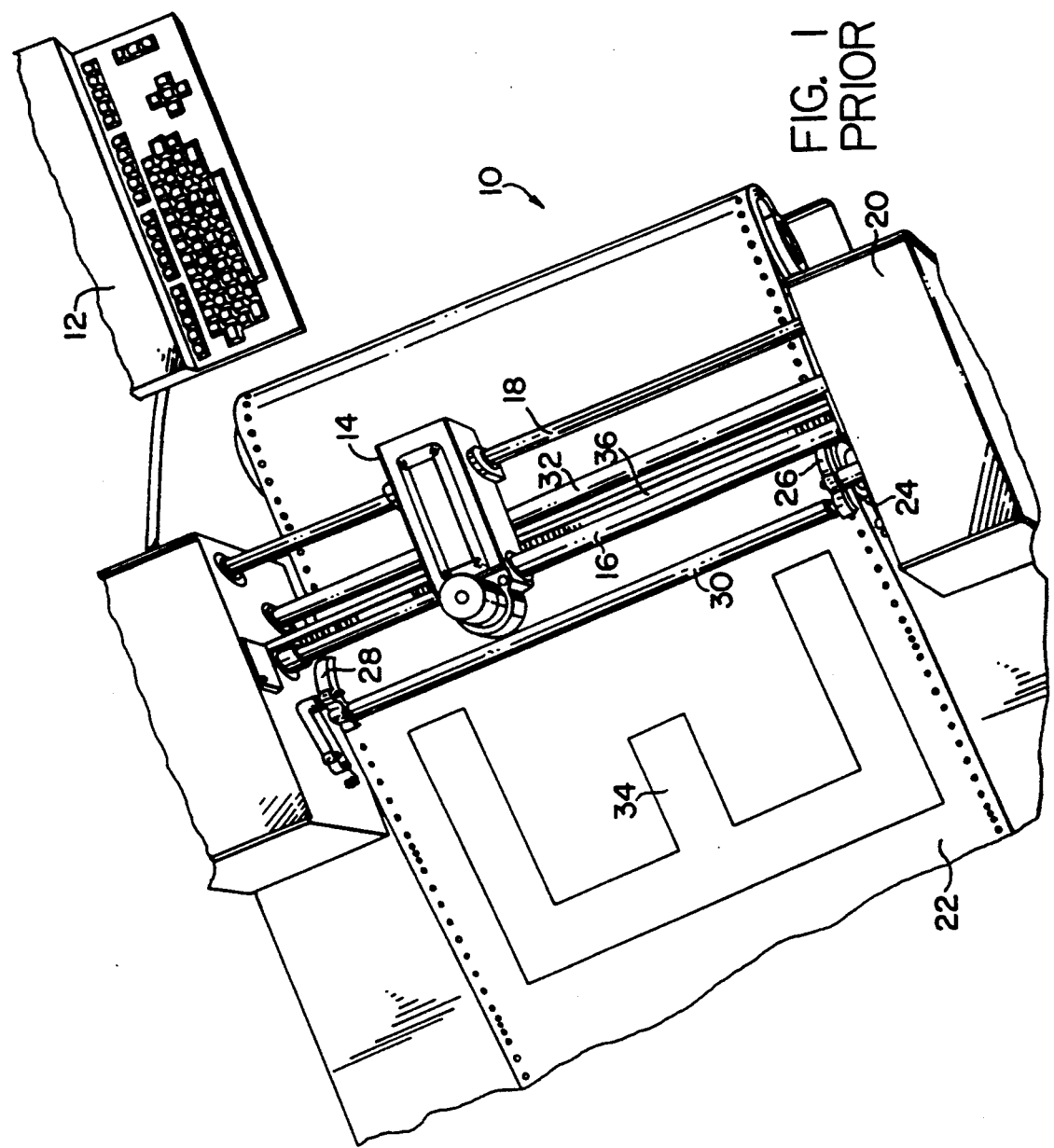
FIG. 1 is a schematic, partial view of an automated sign generator of the general type with which the present invention may be utilized.

Turning now to the drawings and considering the invention in further detail, an automated sign generator such as the one described in the above-reference U.S. patent, is shown therein and generally designated 10. Briefly, the sign generator 10 includes a controller 12 which includes the instruction set for controlling the operation of the sign generator and through which the program data to generate a desired text graphic is stored. The sign generator 10 includes a cutting and plotting tool head 14 which is mounted on a pair of guideways 16,18 above the case 20 of the apparatus for movement transversely of a strip of the sheet material, typically vinyl, and designated 22. The strip is fed longitudinally of itself under the cutting and plotting head 14 by means of a feed roller 24 having feed sprockets at opposite ends of the roller for engaging corresponding sprocket holes in the sign material 22. Arcuately shaped guide clamps 26,28 maintain the sprocket teeth and sprocket holes in engagement as the sheet material 22 is fed longitudinally of itself. A guide bar 30 extends in front of the feed roller 24 in parallel relationship with the roller and in contact with the surface of the sheet material to additionally hold the sign material and guide the material on and off the feed roller as a cutting or plotting operation takes place. A similar guide 32 is located behind the feed roller for the same purposes.

Composite movements of the tool head 14 in one coordinate direction parallel to the feed roller 24 and of the sign material on the feed roller in an orthogonal coordinate direction enable two dimensional characters to be created. As illustrated for purposes of explanation, a letter character designated 34 can be formed on the vinyl sheet material.

The tool head 14 is moved back and forth on the guideways 16,17 by means of a drive belt 36 which is driven by a servomotor and which control is well known in the art. The tool head is further controlled in accordance with the instruction set to move toward and away from the feed roller. Additional details of the operation of an automated sign generator may be gotten from the above-referenced patent. It should be noted that the guidebars 30,32 generally engage the surface of the sheet material 22 to prevent buckling of the sheet material as it moves back and forth during a cutting or plotting operation. It should also be noted that the plotting operation functions as a preview of the graphic to be cut.

Figure 2:
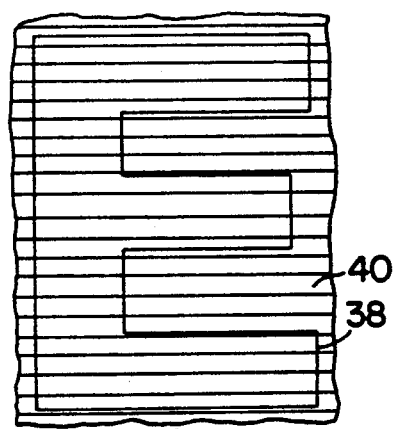
FIG. 2 is a prior art text graphic cut in a vinyl sheet material of a first color.
Figure 3:
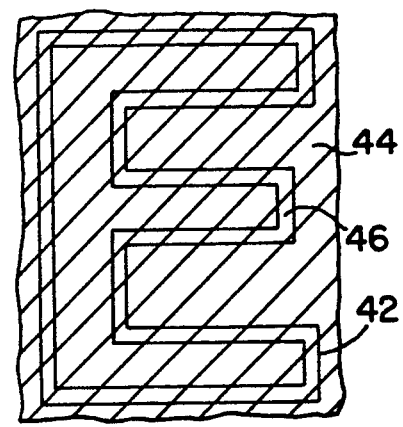
FIG. 3 shows a prior art text graphic cut in a vinyl sheet material of a second color which is to be used with the text graphic of FIG. 2 to produce the enhanced graphic.
Figure 4:
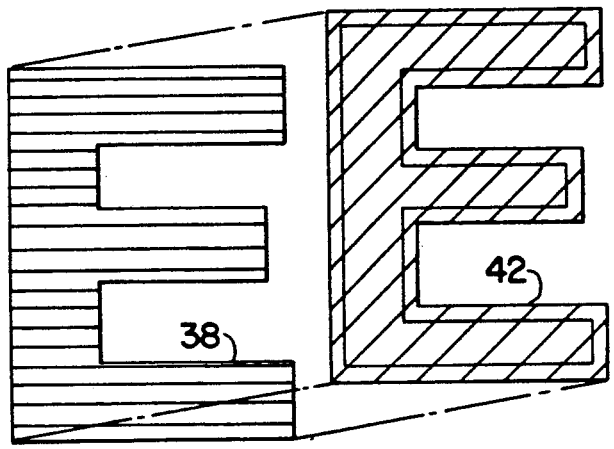
FIG. 4 shows an exploded view of the text graphic of FIG. 3 as it is applied in an overlying manner and in butt registration with the text graphic of FIG. 2.
Figure 5:
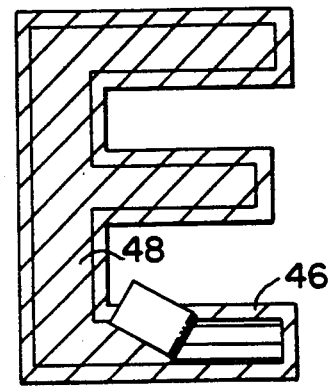
FIG. 5 shows the text graphic of FIGS. 2 and 3 in butt registration wherein the inner material of the text graphic of FIG. 3 is shown partially weeded.
Figure 6:
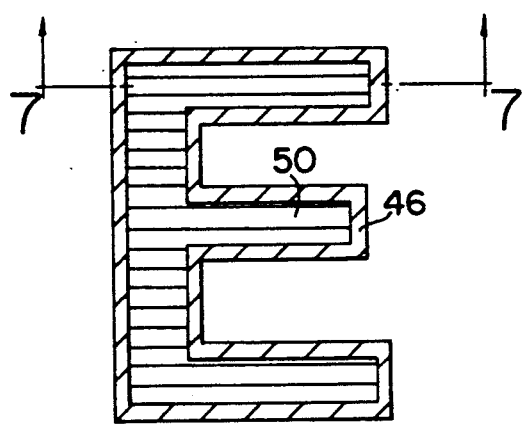
FIG. 6 shows the resultant enhanced multi-color text graphic.
Figure 7:
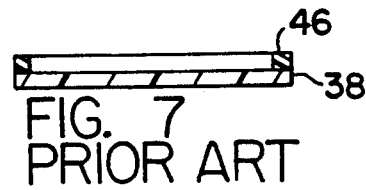
FIG. 7 is a cross section view along the line 7—7 of FIG. 6 showing the double layer vinyl material of the resultant enhanced text graphic.

Turning to FIGS. 2-7, a method for producing an enhanced or special effect graphic with the prior art is explained. FIG. 2 illustrates a text graphic 38 cut in a vinyl sheet material 40 having a first color represented by the horizontally extending lines. The text graphic 38 is cut in the vinyl sheet material in a manner well known to those skilled in the art. For purposes of explanation, it is taken that the enhanced graphic to be produced will include a border having a second color. FIG. 3 illustrates a text graphic 42 cut in a vinyl sheet material 44 having a second color as represented by the diagonally extending lines. Furthermore, the text graphic 42 requires two cuttings in the desired shape to produce the width of the border area generally designated 46. The text graphic 38 in FIG. 2 and the text graphic 42 of FIG. 3 are weeded from their respective vinyl sheet materials and as illustrated in FIG. 4, the text graphic 42 is placed in an overlying and butt registration orientation with the text graphic 38. FIG. 5 illustrates the overlying, composite text graphic. The inner portion 48 of the text graphic 42 is shown partially weeded leaving the border area 46 in an overlying position on the text graphic 38. FIG. 6 illustrates the resultant multi-layer enhanced text graphic wherein the inner portion 50 of the enhanced text graphic is of a first color and the border portion 46 of the enhanced text graphic is of a second color. FIG. 7 is a cross sectional view of the resultant multi-layer composite enhanced text graphic illustrating the overlying layers of different color vinyl sheet material comprising the text graphic.

It is readily seen that the formation of an enhanced or special effect text graphic using the method of the prior art results in the usage of excess vinyl sheet material and further requires skill on the part of an operator to place the component text graphic portions in registration with one another for weeding to produce the desired result. It will also be recognized that the enhanced text graphic utilizing the prior art has a layer thickness greater than a single layer sign due to the double layer of vinyl sheet material comprising the graphic. The thicker sign may be unacceptable and troublesome in some circumstances if the graphic is to be covered for example by a transparent protective face and the like where it is desired to have a minimal profile. A further disadvantage of the composite enhanced graphic is the attached border 46 may be damaged or torn from its position on the text graphic 38.

Figure 8:
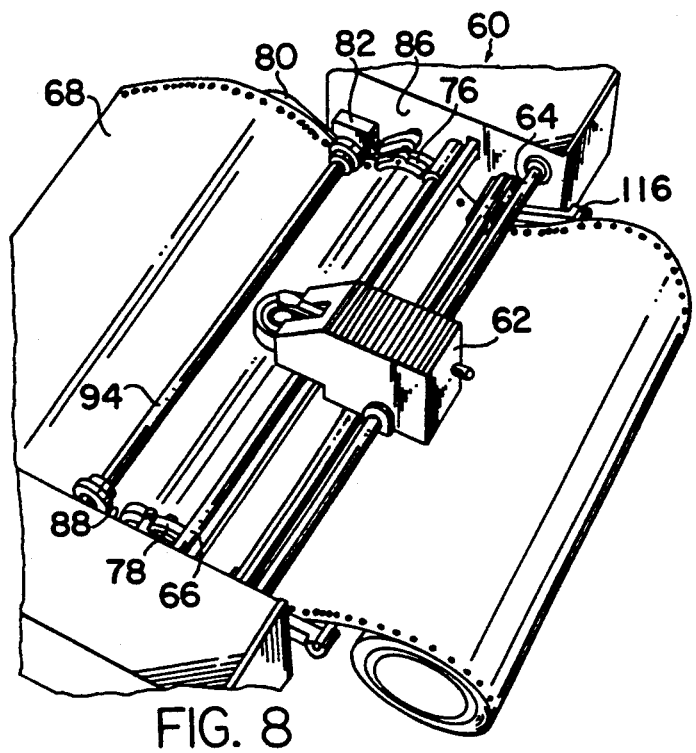
FIG. 8 is a schematic, partial view of an automated sign generator embodying the present invention.
Figure 10:
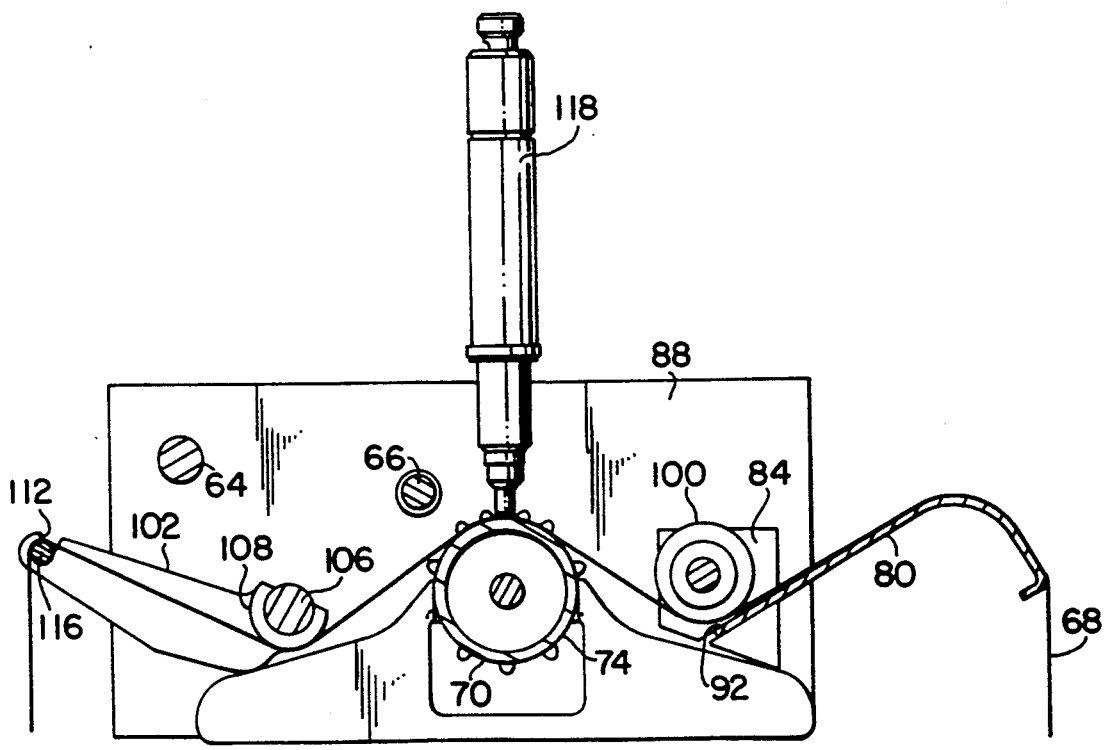
FIG. 10 is a schematic, side elevational view of the automated sign generator of FIG. 9.
Figure 9:
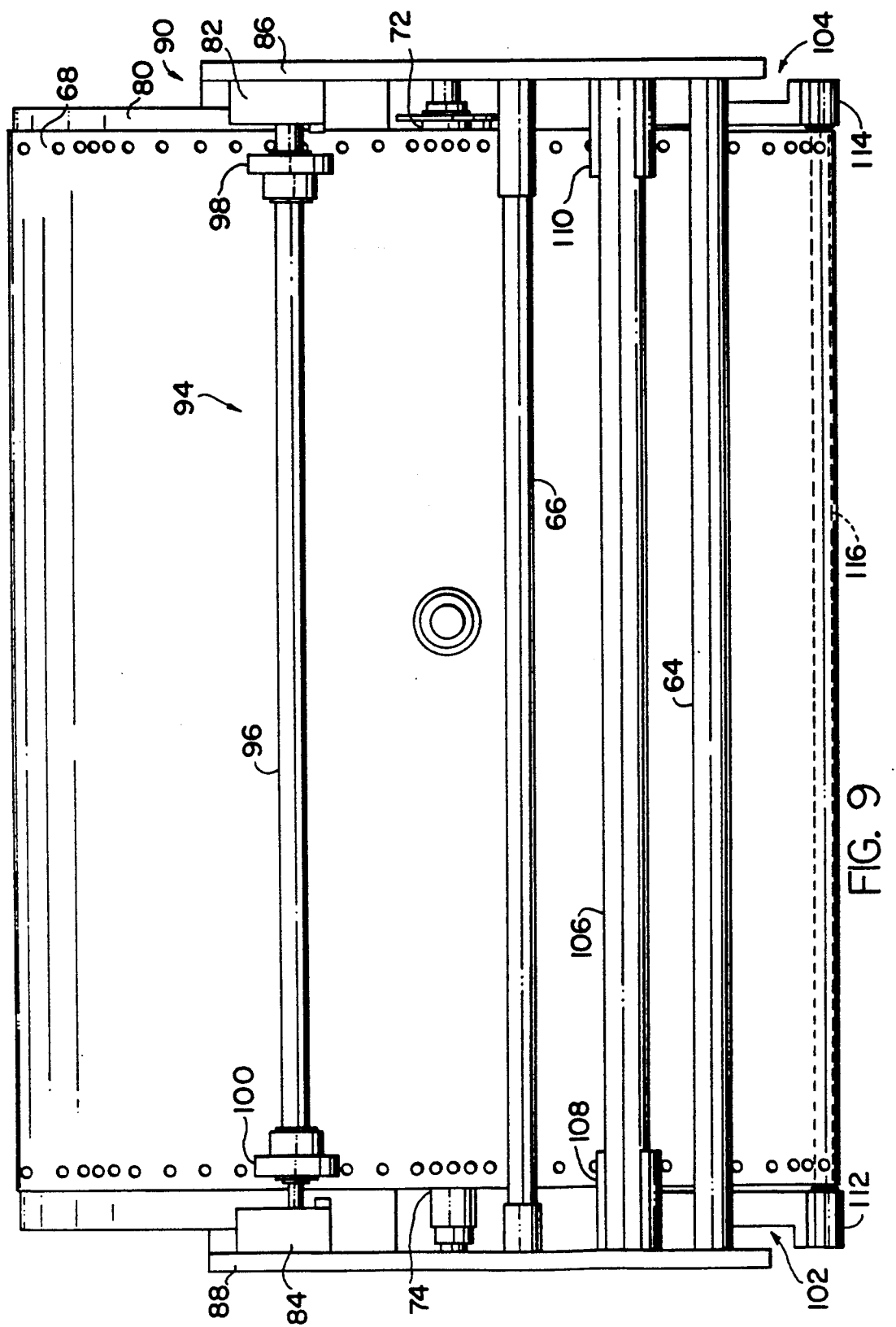
FIG. 9 is a schematic, top plan view of an automated sign generator embodying the present invention.

Now considering the invention in detail, an automated sign generator embodying the present invention is illustrated in FIGS. 8-10 and generally designated 60. It should be noted that the automated sign generator shown in FIGS. 8-10 is similar in appearance to the one illustrated in FIG. 1. The operation of the sign generator is also through a controller (not shown) and which controller is similar to the controller illustrated in FIG. 1. A tool head 62 is mounted on a pair of guideways 64,66 for movement transversely of a strip of sign material 68. The strip is fed longitudinally of itself under the tool head 62 by means of a feed roller or drum 70 having feed sprockets 72,74 at opposite ends of the roller 70 for engaging corresponding sprocket holes in the sign material 68. To insure that the sprocket teeth and the sprocket holes remain in engagement over a substantial segment of the sprockets, arcuately shaped guide clamps 76,78 having an arcuate groove straddling the sprocket are resiliently biased downwardly against the sheet material at each end of the drive roller 70.

In order to prevent the sheet material 68 from buckling as it moves back and forth during the painting and cutting operations, Applicants have found that the plane of the path along which the sheet material travels must be broken. Unlike the sign generator illustrated in FIG. 1, guide bars cannot be used to maintain the sheet material in a flexed condition during the operation since the paint applied to the surface of the vinyl sheet material would be smeared or smudged as the sheet material moves back and forth. In order to solve this problem, a sheet material deflector 80 extends in front of the feed roller 70 in parallel relationship with the roller and has an upwardly curved surface over which the sheet material 68 moves. The material deflector 80 is attached to the apparatus by means of material support blocks 82,84 disposed oppositely from one another and attached to the inner surfaces of the sides 86,88 of the front portion 90 of the apparatus 60. The marginal edges of the material deflector are received by grooves or slots 92 in the material supports 82,84, respectively.

The sheet material is held in a broken plane orientation by means of a sheet material guide wheel assembly generally designated 94 and located intermediate of the feed roller 70 and the material deflector 80. The sheet material guide wheel assembly 94 includes a shaft 96 which extends in front of the feed roller 70 in parallel relationship with the roller and the material deflector 80 and includes guide wheels 98,100 located at opposite ends of the shaft and which wheels ride along the marginal surfaces of the sheet material to maintain the sheet material in a broken plane orientation to prevent its buckling as it moves back and forth during the painting and cutting operation. The guide wheel assembly shaft 96 is held at its ends by the material supports 82,84, respectively. The sheet material 68 is guided on and off the feed roller as a painting or cutting operation takes place by means of a cam clip assemblies 102,104 disposed oppositely one another and which are in snap engagement with a shaft 106 which extends behind the feed roller 70 in parallel relationship with the roller and located above the plane of the path of the sheet material 68. The respective cam clip assemblies 102,104 are in snap engagement with the shaft 106 at the opposite ends of the shaft. The cam clip assemblies have an inwardly extending flange 108,110, respectively which extend over the marginal area of the sheet material and have curved surface to contact and to press downwardly on the marginal portions of the sheet material to break the plane of the path of the material as it passes over the feed roller 70. The cam clip assemblies 102,104 have receiving slots 112,114, respectively to receive a cam clip shaft 116 which is located behind the cam shaft 106 and in parallel relationship with the feed roller and slightly above the plane of the sheet material passing beneath the flange portions 108,110, respectively of the clamp clip assembly. The unique holddown feature of the present invention permits the vinyl sign material to be painted with the desired graphic and move back and forth across the feed roller 70 such that the major surface of the vinyl sheet material is only in contact with the paint pen or cutting tool of the apparatus as the tool head moves them into contact with the surface of the material. A paint pen generally designated 118 is shown schematically in FIG. 10 and described in further detail below. The paint pen 118 is carried by the tool head in one coordinate direction as the vinyl sheet material 68 moves back and forth longitudinally of its length. The coordinated movement of the paint pen 118 and the vinyl 68 produces a desired text or other graphic on the vinyl sheet material.

Figure 11:
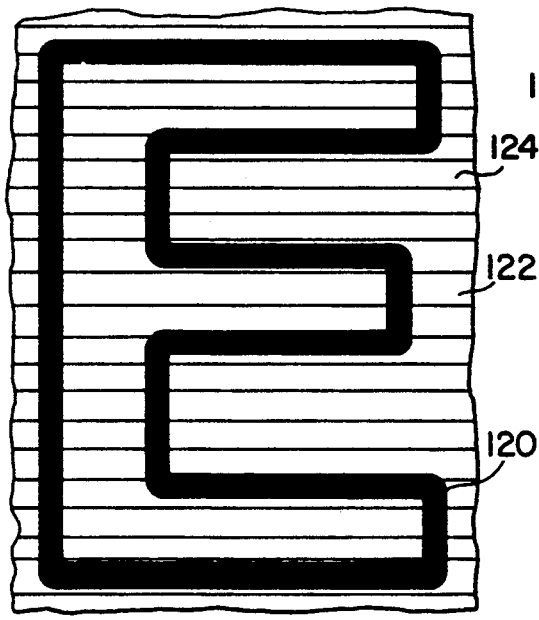
FIG. 11 shows a text graphic painted with a first color on a vinyl sheet material of a second color using the present invention.
Figure 12:
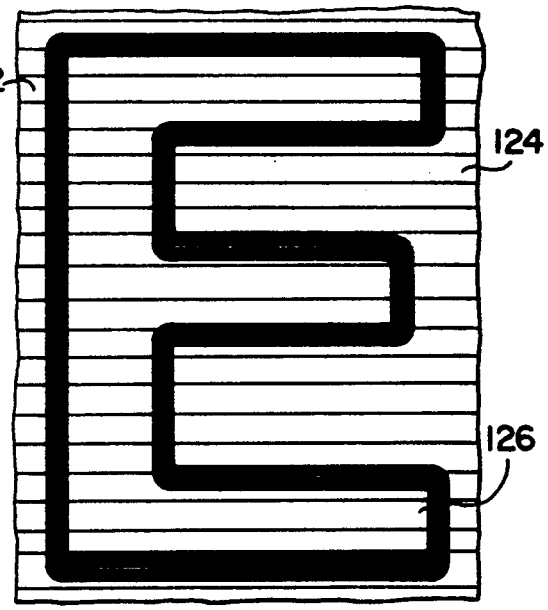
FIG. 12 shows the painted text graphic of FIG. 11 cut in the vinyl sheet material.
Figure 13:
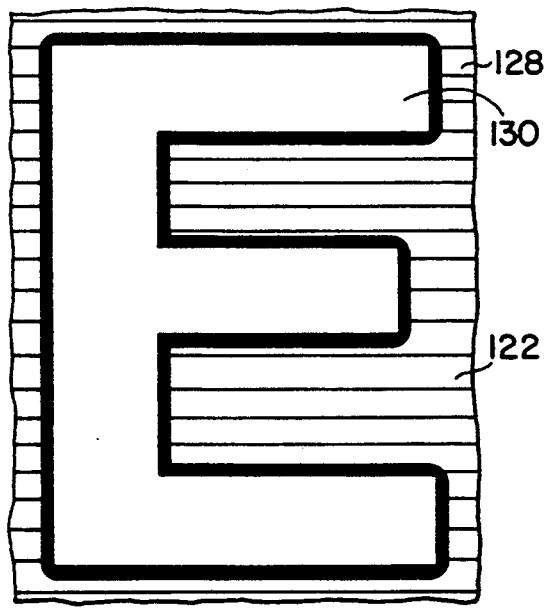
FIG. 13 shows the remaining vinyl sheet material on the release paper with the text graphic removed.
Figure 14:
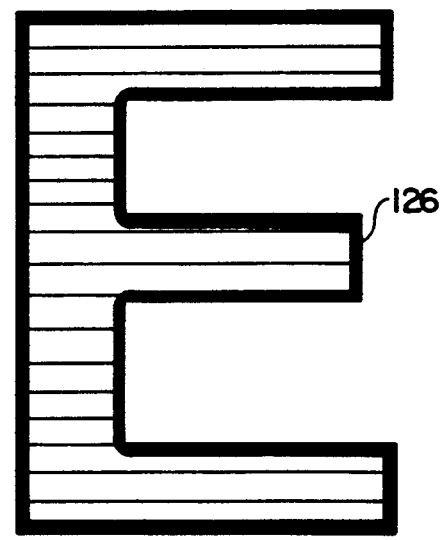
FIG. 14 shows the resultant enhanced multi-color, single layer text graphic.

Turning now to FIGS. 11-14, an enhanced or special effect text graphic produced utilizing the method and apparatus of the present invention is explained. As shown in FIG. 11 and presented for illustrative purposes only, the outline or periphery of a text graphic generally designated 120 is shown painted on the surface 122 of vinyl sheet material 124 having a first color represented by the parallel horizontal lines. The text graphic 120 of the example is painted utilizing a color different than the color of the vinyl sheet material and is shown as a black stripe in the figures. Once the text graphic is painted onto the vinyl sheet material, the paint pen is removed from the tool head and a cutter is inserted in its place. The tool head is now moved with a coordinated relative movement between the tool head and the vinyl sheet material to cut along a line within the stripe. The peripheral edges defining the text graphic are well defined, crisp and sharp to produce the enhanced text graphic generally designated 126. The enhanced text graphic 126 is weeded from the vinyl sheet material 122 as illustrated in FIG. 13 leaving the painted outline 128 of the text graphic on the vinyl sheet material and the release paper liner 130 which releasably carries the vinyl sheet material 122. The resultant single layer, multi-color enhanced text graphic 126 is illustrated in FIG 14. It will be recognized and appreciated that the method and apparatus of the present invention greatly speeds the production of an enhanced or special effect graphic compared to prior methods exemplified above and without the waste of vinyl material usually associated with such production. It will be further recognized and appreciated that the skill level of an operator may be substantially reduced over that of an operator utilizing prior art methods and apparatus for generating enhanced or special effect text graphics due primarily to the elimination of the necessity to butt register overlying graphics as explained above.

It will further be recognized and appreciated that the variations of enhanced or special effect graphics are virtually unlimited dependent upon the style of the paint nib in paint pen utilized, a number of which are explained in further detail below.

Figure 15:
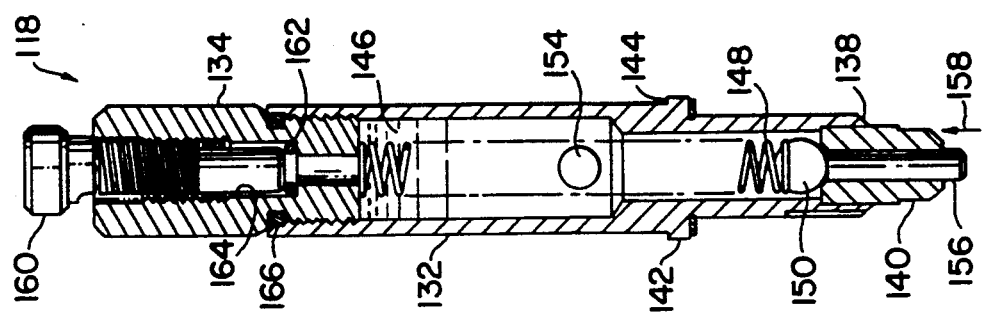
FIG. 15 is a schematic, cross sectional view of a paint pen utilized with the present invention.

Turning now to FIG. 15, a paint pen utilized with the present invention is shown in cross sectional view and generally designated 118. The paint pen 118 includes an axially elongated pen body 132, a pen cap 134 threadably connected to one end 136 of the pen body 132. The pen body 132 includes an open lower end 138 which carries a nib holder 140. A radial flange 142 located intermediate the ends 136 and 138 is used to provide complementary engagement with the tool head 62. The diameter of the paint pen 118 is dimensioned to be received in the tool head 62. A clip on the tool head 62 engages with the upper surface 144 of the radial flange 142 to maintain the paint pen in the tool head. The pen body 132 includes a central axial bore 146 which contains a supply of ink. A continuous spring 148 is located within the axial bore 146 and extends from the upper portion of the nib holder 140 located within the pen body to the inner portion of the pen cap 134 when the pen cap is threadably engaged with the pen body 132. Ink contained within the axial bore 146 is prevented from escaping through the nib holder by means of a ball 150 which is held seated against the upper opening 152 of the nib holder 140. A second slightly smaller ball 154 is carried within the bore of the continuous spring 148 and which ball 154 is used to agitate the supply of paint within the axial bore 146. A porous nib 156 is carried by the nib holder 140 and when moved in an axial direction as indicated by the arrow 158, exerts pressure on the ball 150 thereby allowing ink within the chamber 146 to contact the porous nib and be transferred from the chamber to a surface which is in contact with the nib.

The pen cap 134 further includes a vent 160 which is axially, threadably engaged in the pen cap 134 such that when the vent 160 is unscrewed, communication is provided between the atmosphere and the chamber 146 to prevent a vacuum from occurring as the paint is withdrawn from the chamber. An O-ring 162 surrounds the radial portion of the vent 160 and seats with the inner bore 164 of the pen cap 134 to prevent ink from leaking from the chamber 146 when the pen is not in use and in a position other than a vertical orientation. An O-ring 166 is also provided between the pen cap 134 and the pen body 132 to provide a seal between the ink chamber 146 and the pen cap 134 when the pen cap 134 is threadably engaged with the pen body 132. It will be noted that the paint pen may be easily disassembled for cleaning and/or repair.

Figure 18:
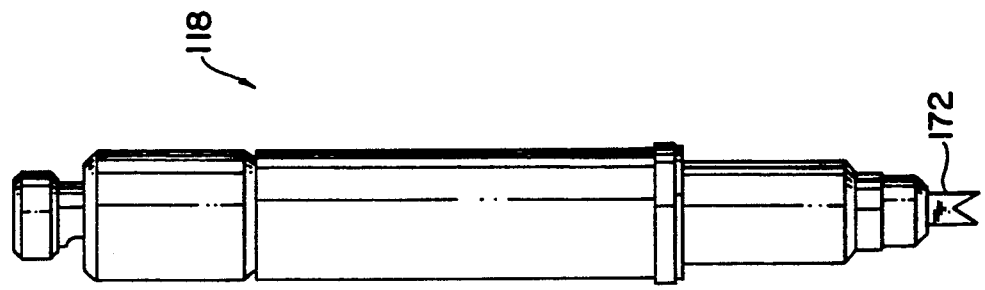
FIG. 18 is a schematic, elevational view of a paint pen having a forked nib.
Figure 17:
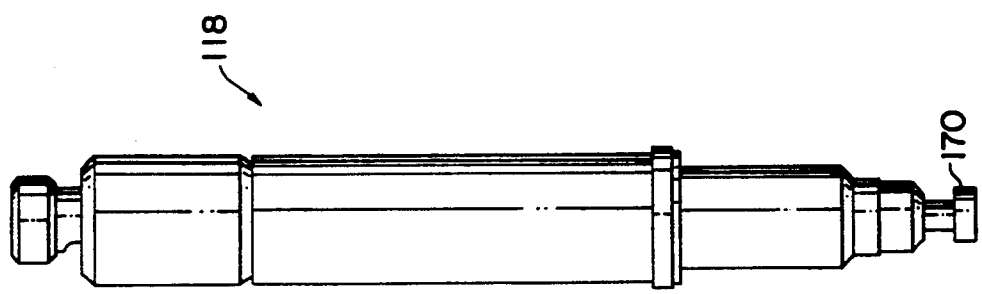
FIG. 17 is a schematic, elevational view of a paint pen having a rectangular nib.
Figure 16:
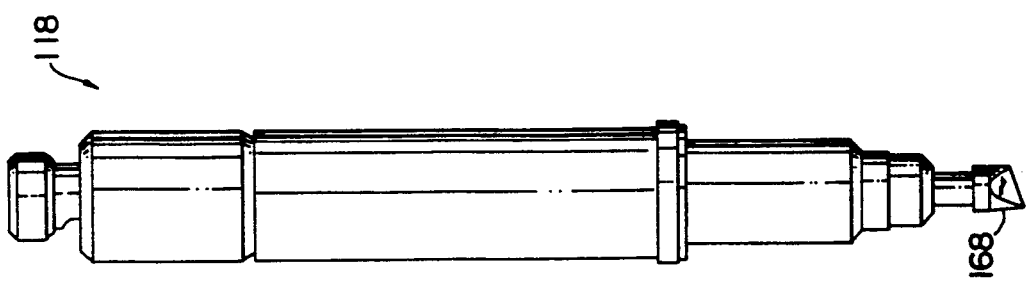
FIG. 16 is a schematic, elevational view of a paint pen having a wedge shaped nib.

The paint pen utilized with the present invention may be equipped with nibs having different shapes dependent upon the enhanced graphic effect desired. FIG. 16 shows a paint pen 118 with a wedge shaped nib 168. FIG. 17 shows a paint pen 118 with a rectangular shaped nib 170. FIG. 18 shows a paint pen 118 with a forked nib 172. Graphics may be generated with stripes, shadowing, outlining and other such features.

A method and associated apparatus for use with an automated sign generator to produce an enhanced graphic effect has been presented. Numerous changes and substitutions may be made by those skilled in the art without departing from the spirit and scope of the invention and therefore the invention has been disclosed by way of illustration rather than limitation.

We claim:

1. Method for producing an enhanced graphic text on a laminated sheet material using an automated sign generator of the general type including a controller for directing the operation of the sign generator to produce relative coordinate movement between the head of the sign generator and the surface of the sheet material in accordance with a programmed instruction set stored in a memory, said method comprising the steps of:
    painting a stripe defining the peripheral outline of a desired graphic text directly on the surface of the sheet material with a paint pen carried by the sign generator head wherein the step of painting with the paint pen further includes using at least one a number of different style paint nibs each of which paint a different figuration stripe on the sheet material;
    cutting the surface layer of the laminated sheet material along a path following the painted stripe defining the graphic text and within the width of the painted stripe, and
    removing the graphic text from the sheet material along the cut line whereby the graphic text having the enhanced visual special effect is produced.

2. Method for producing an enhanced graphic text as defined in claim 1 wherein the sheet material is a vinyl sheet material releasably secured to a release liner.

3. Method for producing an enhanced graphic text as defined in claim 2 wherein the sheet material is of a first color and the stripe defining the peripheral outline of the desired graphic text is painted over the sheet material with a second color thereby producing a graphic text of one color having a peripheral border of a second color.

4. In combination with an automated sign generator of the general type including a controller for directing the operation of the sign generator in accordance with a programmed instruction set stored in a memory for moving a tool head in one coordinate direction across the surface of a laminated sheet material moving in a second coordinate direction whereby the coordinated movements of the tool head and the sheet material trace the shape of a graphic defined by the instruction set, apparatus for producing the defined graphic with an enhanced visual effect, said apparatus comprising:
    paint pen means carried by the tool head for painting a stripe of paint defining the general peripheral outline of the defined graphic;
    means for flexing the laminated sheet material as the sheet material moves back and forth longitudinally of its length to maintain the surface of the sheet material in the region of the tool head in a fixed spacial relationship with the tool head and to prevent paint applied to the surface of the sheet material from becoming smeared as the sheet material moves relative to the tool head, and
    cutting means carried by the tool head for cutting the surface layer of the laminated sheet material along a path falling within the stripe painted on the surface of the sheet material whereby the cut portion of the surface layer is removed from the laminated sheet material and comprises the defined graphic having an enhanced visual special effect.

5. Apparatus as defined in claim 4 wherein said means for flexing the laminated sheet material includes:
    a feed roller which engages the marginal portions of the sheet material for movement in the second coordinate direction, the feed roller having an axis of rotation and supporting the surface of the sheet material in a first plane;
    sheet material deflector means located in front of the feed roller and having an upwardly sloping surface and a curved following edge in parallel relation with the feed roller and for supporting the sheet material as it moves in the second coordinate direction, said curved following edge laying in a second plane parallel to said first plane;
    sheet material guide wheel assembly means located intermediate the feed roller and said sheet deflector means and in parallel relation thereto, said assembly including guide wheels for riding along the marginal portions of the sheet material, said guide wheels having an axis of rotation lying in a third plane parallel to said first and second planes and lying beneath said first and second planes to cause the sheet material to travel along a path following a broken plane orientation to prevent the sheet material from buckling as it moves in the second coordinate direction.

6. Apparatus as defined in claim 5 wherein said means for flexing the laminated sheet material further includes:
    cam clip assembly means located behind the feed roller and in parallel relation thereto for engaging the marginal portions of the sheet material and for supporting the sheet material as it moves longitudinally of its length, said cam clip assembly means having a cam clip shaft in parallel relation with the feed roller and lying in a fourth plane parallel to said first plane for supporting the sheet material as it moves in the second coordinate direction, said cam clip assembly means having an inwardly facing flange portion intermediate the feed roller and said cam clip shaft and extending generally orthogonal to the direction of movement of the sheet material and lying in a fifth plane parallel to and beneath said first and fourth planes to cause the sheet material to travel along a path following a broken plane orientation to prevent the sheet material from buckling as it moves.

7. Apparatus as defined in claim 4 wherein said paint pen means further comprises:

an axially elongated body having a central bore forming a chamber for holding a supply of paint;

nib holding means attached to a lower end of said body for slideably receiving and frictionally holding a paint nib, said paint nib extending axially outward beyond said nib holding means and axially inward substantially to said chamber;

pen cap means releasably attached to an upper end of said body for sealingly closing said chamber;

valve means located within said chamber for sealing said chamber to prevent ink from reaching said nib when said paint pen is not in use, and for providing communication between said nib and said chamber when said paint pen is in use, said valve means further comprising a ball and biasing means for urging said ball in one direction into sealing engagement with said nib holding means when said pen is not in use, said nib contacting and moving said ball in the opposite direction when a force is applied to said nib in an axial direction to overcome the force developed by said biasing means whereby paint in said chamber comes into contact with said nib;

agitator means located within said chamber for mixing paint contained within said chamber, and means for venting said paint chamber to prevent a vacuum from developing within said chamber when said paint pen is in use.

8. Apparatus as defined in claim 7 wherein said paint pen body is dimensioned and shaped for interchangeability with a cutting tool and complementary engagement with the tool head of the sign generator.

9. Apparatus as defined in claim 7 wherein said paint pen includes a plurality of different paint nibs each associated with and providing a different visual special effect on a defined graphic.

10. Method for producing a transfer graphic having an enhanced visual appearance wherein the transfer graphic is cut from a surface layer of a laminated vinyl sheet material using an automated sign generator of the general type including a controller for directing the operation of the sign generator to produce relative coordinate movement between the head of the sign generator and the face of the laminated sheet material in accordance with a programmed instruction set stored in a memory in the sign generator, said method comprising:

the step of providing a paint pen adapted to be carried by the head of the sign generator for movement therewith;

the step of painting at least one stripe of paint on the face of the surface layer of the vinyl laminated sheet material along a path defining the desired graphic to be produced wherein the painted stripe has a width and is painted with at least one a number of different style paint nibs in contact with the face of the surface layer;

the step of moving the laminated sheet material longitudinal of its length in such a manner as not to contact the face of the surface layer to prevent the painted stripe from becoming smeared or smudged;

the step of providing a cutting tool adapted to be carried by the head of the sign generator for movement therewith, the paint pen and cutting tool being interchangeable;

the step of cutting the surface layer of the laminated sheet material along the path defining the periphery of the desired graphic wherein the cut is within the width of the painted stripe so that a portion of the painted stripe is left on both sides of the cut path, and the step of removing the cut graphic from the laminated sheet material along the cut path wherein the surface of the graphic contains the portion of the painted stripe outlining the periphery of the graphic to provide a graphic having an enhanced visual special effect appearance.

11. Method for producing a transfer graphic having an enhanced visual appearance as defined in claim 10 further comprising the step of painting on the face of the surface layer of the vinyl laminated sheet material in the area defined within the periphery of the desired graphic.

12. Method for producing a transfer graphic having an enhanced visual appearance as defined in claim 10 further comprising the step of painting on the face of the surface layer of the vinyl laminated sheet material within the peripheral area defined by the painted stripe.

13. Method for producing a transfer graphic having an enhanced visual appearance as defined in claim 10 wherein the step of painting at least one stripe comprises painting a stripe with a wedge nip to produce a shadowing effect.

14. Method for producing a transfer graphic having an enhanced visual appearance as defined in claim 10 wherein the step of painting at least one stripe comprises painting a stripe with a forked nib to produce a spaced apart parallel line effect.

* * * * *